UNITED STATES PATENT OFFICE.

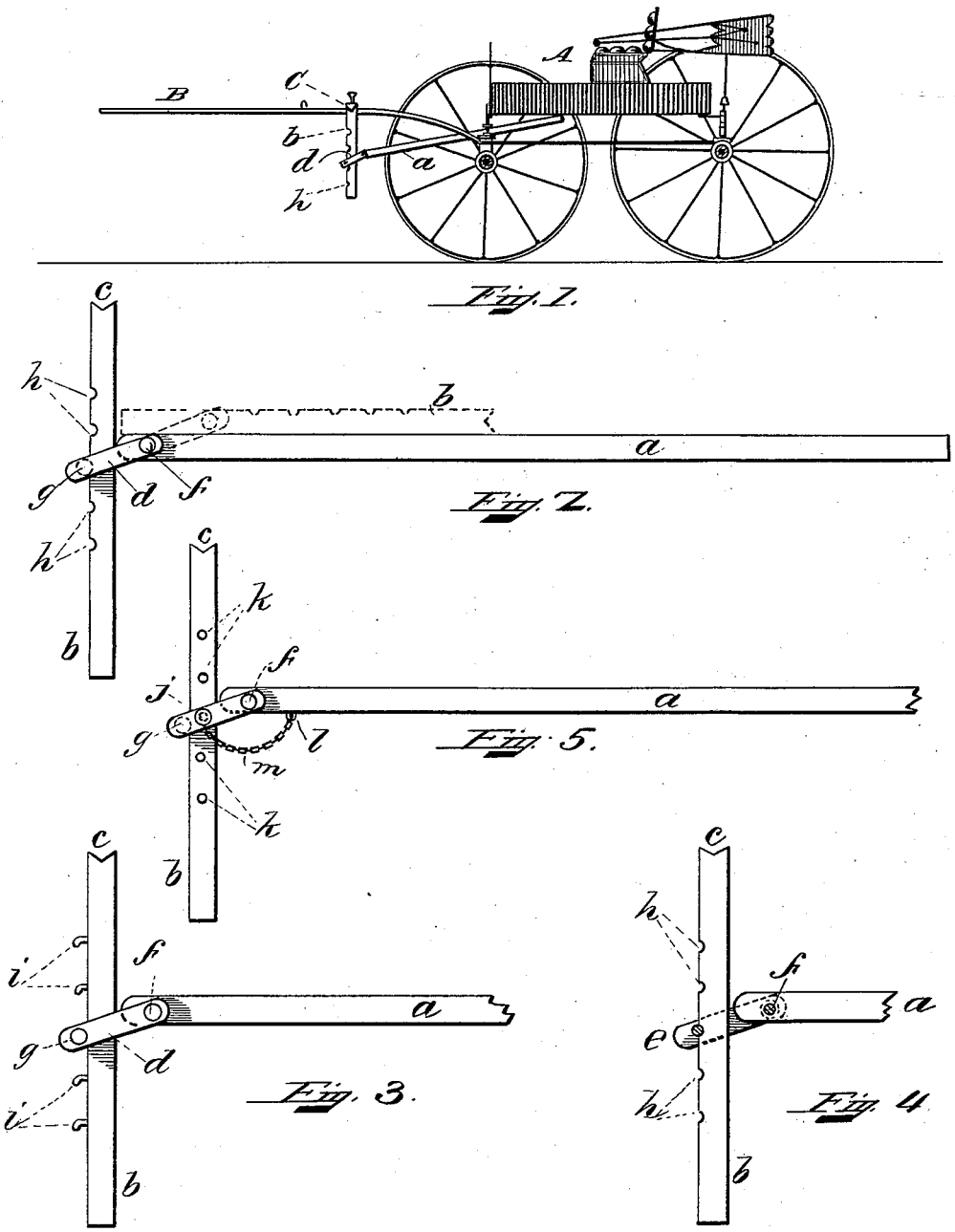

HENRY K. PORTER AND FRED V. WOOSTER, OF BOSTON, MASSACHUSETTS.

VEHICLE-SHAFT SUPPORTER.

SPECIFICATION forming part of Letters Patent No. 533,082, dated January 29, 1895.

Application filed April 14, 1894. Serial No. 507,554. (No model.)

*To all whom it may concern:*

Be it known that we, HENRY K. PORTER and FRED V. WOOSTER, of Boston, in the county of Suffolk and State of Massachusetts, have invented a new and useful Improvement in Shaft-Supporters, which will, in connection with the accompanying drawings, be hereinafter fully described, and specifically defined in the appended claim.

In said drawings: Figure 1. is a side elevation of a vehicle with our invention applied thereto. Fig. 2. is an enlarged side elevation of our invention, separate from the vehicle. Fig. 3. is a view like Fig. 2 except that pins are inserted in the vertical bar in place of notches therein. Fig. 4. is a figure like Fig. 2 except that the near strap that aids in constituting the device is removed and the securing rivets are shown in cross section. Fig. 5. is like previous figures except that a pin passes through the clevis and vertical bar to hold said bar in place, instead of passing in front of said bar.

This invention relates to a device for holding in an elevated position the hinged shafts of vehicles, when not in use; and it consists in a bar adapted to be inserted between the front spring or rocker and the bottom of the body, and a vertical bar hinged by a device to said first named bar so as to be adjusted in the extent that it is above the same when in use, and with notches or equivalents in said vertical bar by which, when adjusted, it can be so locked, while in use, as will be next herein described.

Referring again to said drawings, A represents a vehicle which may be of any class or kind. B represents the shafts of said vehicle, and C the cross-bar that unites said shafts, which parts of the vehicle are referred to as an aid to the description of this invention, and may be of any style or kind.

In our invention we employ the bar $a$ which is a plain straight bar of wood having the front end rounded as shown. We also employ the bar $b$, that when in use is practically vertical and at about right angles to bar $a$. To the rounded end of bar $a$ is secured the metal clevis which is composed of plates $d$ and $e$, which are secured to bar $a$ by rivet $f$, so as to vibrate on said bar. The outer ends of said plates are secured by rivet $g$ so as to constitute a clevis in which bar $b$ can be moved endwise as desired. For the purpose of holding bar $b$ at any desired point in said clevis, there may be a series of indentations $h, h$ formed in its front face, so that when the clevis is in line with bar $a$ bar $b$ can slide freely between the end of $a$ and rivet $g$, but when force is applied to the top of $b$ it is locked by rivet $g$. Instead of indentations $h$, a series of pins $i, i$ may be inserted in the front edge of bar $b$ as shown in Fig. 3, which pins will catch on rivet $g$ when force is applied to the top of bar $b$; or an additional hole may be made in said clevis and a bolt $j$ inserted therein, it passing through a hole $k$ when bar $b$ is properly adjusted.

In use, bar $a$ is arranged as shown in Fig. 1, and bar $b$ is arranged so as to extend to the desired height above $a$, and the cross-bar C is placed in the depression $c$ in the end of bar $b$, so that shafts B are held at the desired height. When not in use part $b$ may be turned back on part $a$ as shown by dotted lines in Fig. 2, and this whether indentations $h$ or pin $i$ or holes $k$ are employed for securing bar $b$ in position when in use. If holes $k$ and pin $j$ are employed, then said pin may be secured by chain $m$ attached to said pin and anchored to staple $l$ secured in bar $a$. By the use of the clevis, the bar $b$ is held directly in line with the bar, $a$, the two bars being thus balanced in proper position, and the bar, $b$, may be turned backward and placed on the bar $a$, when not in use, as shown.

What we claim as new, and desire to secure by Letters Patent, is—

The shaft supporter having a bar $a$, and a bar $b$ having a notch $c$ in its top and held to and in line with bar $a$ by a clevis formed of plates $d$ and $e$, held by bolts $f$ and $g$, the said bar $b$ being provided with notches $h$ at intervals, arranged to allow bar $b$ to be instantly raised or lowered and set at any point as desired, substantially as set forth and described.

HENRY K. PORTER.
FRED V. WOOSTER.

Witnesses:
N. W. GREEN,
T. W. PORTER.